April 25, 1939.  E. V. DARDANI  2,156,085
SPEEDOMETER
Filed July 16, 1937  2 Sheets-Sheet 1
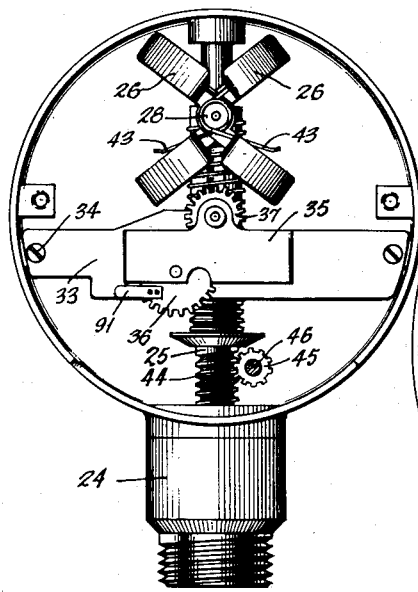
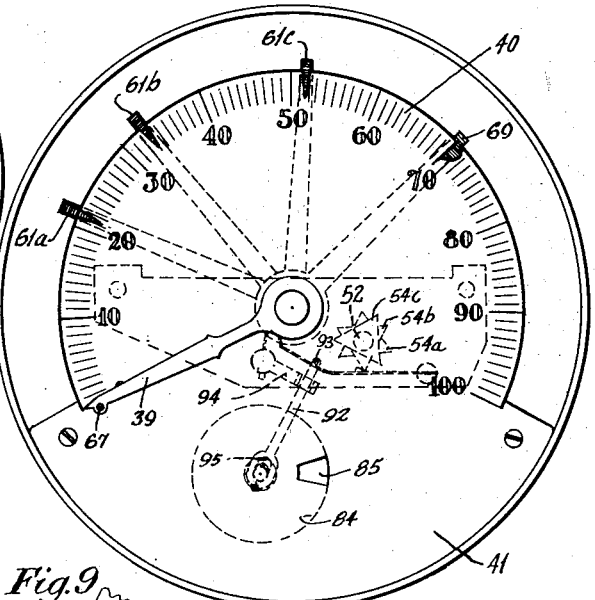
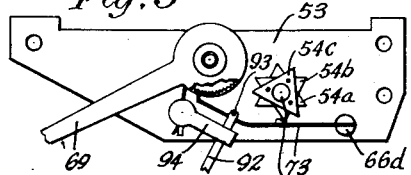
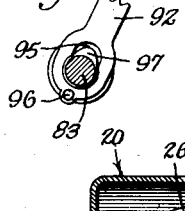
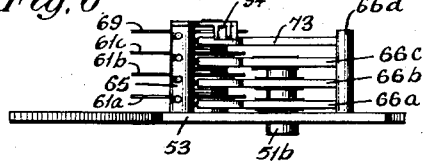
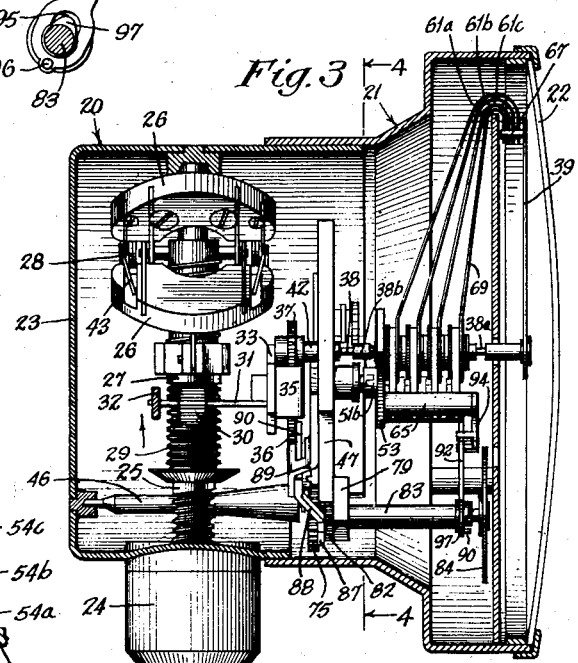
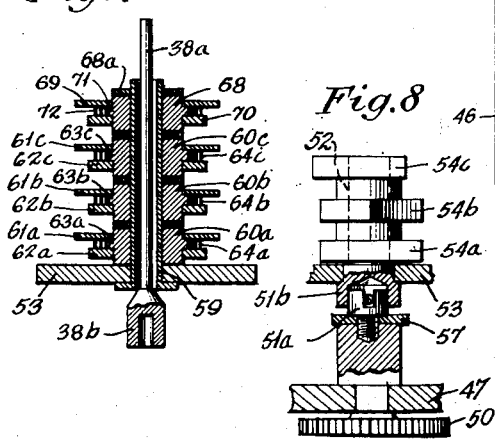
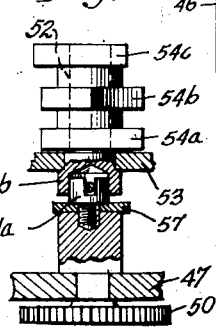
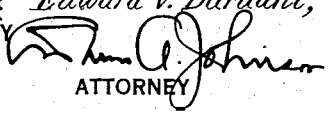
INVENTOR
Edward V. Dardani,
BY
ATTORNEY April 25, 1939.  E. V. DARDANI  2,156,085

SPEEDOMETER

Filed July 16, 1937   2 Sheets-Sheet 2

INVENTOR
Edward V. Dardani,
BY
ATTORNEY

Patented Apr. 25, 1939

2,156,085

UNITED STATES PATENT OFFICE 2,156,085

SPEEDOMETER

Edward V. Dardani, Southport, Conn.

Application July 16, 1937, Serial No. 153,947

8 Claims. (Cl. 264—1)

This invention relates to speedometers and more particularly to speedometers for motor vehicles.

An object of the present invention is to provide a speedometer which will indicate to the driver, and all others concerned, the deceleration of the vehicle when the vehicle is slowed down or stopped and also the maximum speed attained by the vehicle.

Many accidents occur from automobiles traveling at high speeds. It is desired, therefore, to indicate the maximum speed attained by the automobile and also the deceleration of the automobile from the time at which an attempt is made to stop the automobile. Many attempts have been made to secure such a record for a purpose of determining the exact circumstances present at the time of the accident because, as is well known, it is difficult to obtain accurate information from witnesses as to the matter of speeds.

According to the present invention a device is provided which indicates the maximum speed which the automobile attained and which maximum speed remains registered or indicated until the motor vehicle has been moved a predetermined distance after being stopped. Also a means is provided in connection with the resetting means for the maximum speed indicator which will indicate that the automobile has been stopped and restarted.

In prior devices of this type, a plurality of hands have been placed on the face of the dial to make the desired indications. This is confusing since the operator of the machine cannot quickly determine which hand is the speed-indicating hand. Also this arrangement requires that the sleeves for the pointers extend through the dial. According to the present invention, this difficulty has been overcome by positioning the indicating hands behind the dial so that they extend only over the edge of the dial and cooperate with the indicia on the dial to show the various speeds at predetermined intervals during deceleration.

A further feature of the invention is the provision of a resiliently mounted gear to cooperate with a mutilated gear for actuating the resetting means for the maximum speed indicator after the automobile has stopped. This mounting for the gear will permit the mutilated gear to be moved into mesh with the resiliently mounted gear without damage to the latter gear.

It will be seen, therefore, that the applicant has provided an indicator which will show the speeds of the automobile at various times during the decelerating period and also simultaneously show the maximum speed attained by the automobile. The means for resetting the decelerating indicators and the maximum speed indicator are separate so that the maximum speed indication remains fixed throughout the decelerating period.

It will be further seen that the present invention provides a means for giving a history of past speeds at spaced intervals so that, in the event of an accident or the like where a stop is made after a sudden deceleration caused by the application of the brakes of the vehicle, an indication is given showing the speed of the vehicle at predetermined times relative to distance travelled from the time the brakes were applied until the vehicle came to a rest.

Further advantages and features of the invention will be apparent from the specification taken in connection with the drawings.

In the drawings:

Figure 1 shows an elevation of the back section of the housing with part of the mechanism removed for clearness.

Fig. 2 shows a front view of the housing.

Fig. 3 shows a section of the casing with the indicating means in position.

Fig. 5 shows an elevation of the bracket carrying the indicating arms and the resetting arms.

Fig. 6 is a view of Fig. 5 looking from the bottom in the direction of the arrow 6.

Fig. 7 shows a detailed construction of the mounting means for the auxiliary indicators.

Fig. 8 shows a detailed view of the reset cams and mechanism for actuating the same.

Fig. 9 is a detailed view of the mechanism of operating the reset means for the maximum speed indicator.

Figure 4:
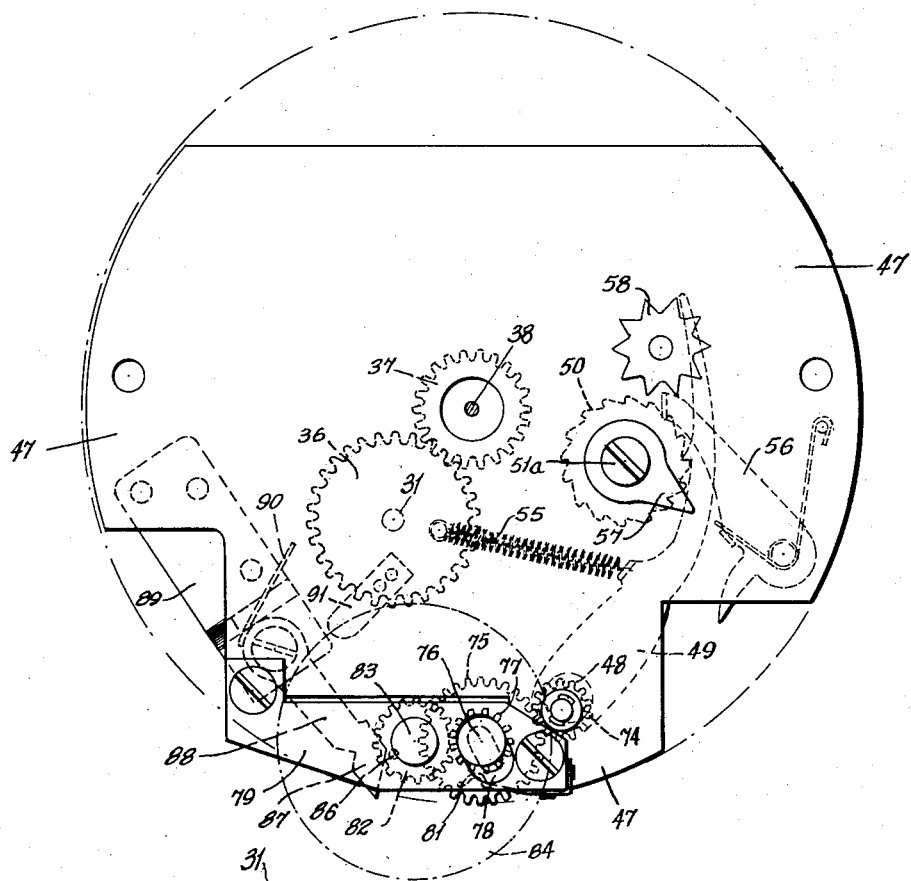
Fig. 4 shows an elevation of the mounting plate with the gears in their relative positions.

As shown in the accompanying drawings the instrument to which the present invention is applied comprises a two part casing. A front section 21 is open at its front end and is covered by a glass 22 through which the indicators may be viewed. The front section telescopes a back section 20, as shown in Fig. 3. The back section 20 is closed at the end by a back 23 and at the bottom has a usual speedometer drive connection 24. A vertical shaft 25 is mounted in the back section of the casing and is connected to the flexible shaft of the speedometer cable in the usual manner. The usual weights 26 found in centrifugally operated speedometers are pivotally mounted to the shaft 25. A sleeve 27 is mounted to slide on shaft 25 and is connected by a plurality of links 28 to the weights 26 so that as the shaft 25 is rotated the weights will fly outwardly and tend to move the sleeve upwardly in the direction of the arrow shown in Fig. 3.

The sleeve 27 has formed on its outer surface a series of rings 29 forming teeth adapted to be engaged by a pinion 30 mounted on a shaft 31. This form of gearing enables the gear to be always in mesh with the sleeve though the sleeve is rotated as well as moved longitudinally of the shaft 25.

One end of the shaft 31 is journalled in a bracket 32 (see Fig. 3) extending from the cross bar 33 secured to the casing by means of a pair of screws 34. The other end of the shaft is journalled in the cross bar 33 and a bracket 35 secured thereto. Between the bracket 35 and the cross bar 33 the shaft has mounted thereon a gear 36. The gear 36 meshes with a gear 37 secured to a shaft 38 journalled in a bearing 42 carried by the bracket 35. An extension shaft 38a, mounted by means of a suitable coupling 38b, is connected to rotate with shaft 38. Shaft 38a carries at its outer end a pointer or indicator 39 which is driven by the speed-responsive means. The pointer 39 swings over a scale 40 on plate 41 secured to the casing. The weights 26 are normally biased into a position adjacent the shaft by a set of springs 43. As the shaft is rotated the weights will fly out under the action of centrifugal force and cause the sleeve to move upwardly, and through the pinion engaging the teeth on the sleeve, the shaft 31 will be rotated which will rotate the gear 37, shaft 38 and extension 38a and move the pointer across the scale to indicate the speed at which the vehicle is driving.

On the lower portion of the shaft 25 there is formed a worm 44 which meshes with a worm gear 45 on a shaft 46 mounted in bearings in the casing at one end and in a transversely-extending plate 47 at the other end. This shaft is formed with an eccentric portion 48 which actuates a pawl 49. The pawl 49 operates a ratchet 50 having a driving connection 51a adapted to engage a driving connection 51b on a shaft 52 mounted in a plate 53. The shaft 52 carries the reset cams 54a, 54b and 54c to be later described. A spring 55 normally biases the pawl into engagement with the ratchet. A locking pawl 56 of the usual type engages the ratchet to prevent stepping of the ratchet in the wrong direction. An operating finger 57 is carried by the ratchet and engages a tooth wheel 58 mounted on the plate 47 which may be connected to an odometer, if desired.

It will be seen, therefore, that as shaft 25 rotates, the shaft 46 will be driven thereby through the worm 44 and worm gear 45 and the eccentric portion of the shaft will operate the pawl to step the ratchet to cause the shaft and the cams associated therewith to be moved in accordance with the distance traveled by the automobile.

According to the present invention it is desired to provide auxiliary indicators which are adapted to be operated seriatim to indicate the speed of the vehicle at predetermined distances of travel of the vehicle after the operator has started to apply the brakes. These indicating means have been positioned behind the dial with the ends thereof extending over the edge of the dial and in cooperative relation with the indicia on the dial. This prevents any confusion from arising due to the positioning of these elements on the face of the dial. The only indicating element moving over the face of the dial is the speed-responsive pointer.

In order to mount the auxiliary indicators behind the dial, a sleeve 59 has been mounted on plate 53 and secured thereto. The sleeve surrounds the shaft 38a and is concentric therewith. A plurality of collars 60a, 60b and 60c, are mounted for free rotation on the sleeve 59 and are separated by washers secured to the sleeve. These collars carry a plurality of pointers 61a, 61b and 61c, one for each collar, which extend upwardly from the collar and over the edge of the dial, as shown in Fig. 3. Each of the collars is provided with a ratchet 62a, 62b and 62c and has a hub 63a, 63b and 63c around which is positioned a hair spring 64a, 64b and 64c connected thereto at one end and which has its other end connected to a post 65. Cooperating with the ratchets 62a, 62b and 62c are a plurality of pawls 66a, 66b and 66c which are secured to a post 66d mounted on plate 53. The hair springs are secured to the freely rotatable collars so as to normally move all of the auxiliary pointers or indicators toward initial position. A pin 67 is carried by the sped-responsive pointer 39 and is positioned to engage the auxiliary pointers and move them over the dial from initial position. As the speed of the vehicle is decreased during the decelerating period the pawls will hold the auxiliary indicators from moving toward initial position until the resetting cams 54a, 54b and 54c are actuated to release the pointers seriatim at predetermined intervals of time determined by the odometer actuated by pawl 49, at which time the pointers move under the urge of the hair spring to engage the pin 67 and indicate the speed at that instant which corresponds to a distance of say fifty feet of travel of the automobile. This will give a definite story of the speeds of the automobile for the fifty feet intervals just prior to stopping the same. The cams will reset the pointers after restarting.

In order to register the maximum speed attained by the vehicle, a collar 68 is mounted on the sleeve 59 and held thereon by a washer 68a secured to the sleeve 59 in any manner. The collar has a pointer 69 mounted thereon so as to be positioned behind the dial with its end extending over the edge of the dial as shown in Fig. 3. The collar is provided with a ratchet 70 and a hub 71. A hair spring 72 is secured to the hub at one end and at the other end to the post 65 and normally biases the pointer to move toward the zero position. In this position the pointer is adapted to engage the pin 67 and be moved by the speed-responsive pointer 39. A pawl 73 secured on post 66d engages the ratchet on the hub and prevents the pointer from moving backward to zero position when the speed-responsive pointer moves in that direction during deceleration.

According to the present invention, means, separate from the means for resetting the auxiliary pointers, are provided for resetting the maximum speed pointer after the automobile has stopped and has resumed travel for a short distance. The device also includes a means for indicating that such a stop has occurred. While this means is disclosed in the preferred form as being an odometer, it is obvious that it may take any form such as a light or other signal which will be operated to indicate that the automobile has come to a stop and has been restarted.

In the preferred form of this means, a gear 74 is mounted on the end of the shaft 46 to be driven thereby and is adapted to mesh with a gear 75 mounted on a shaft 76. Another gear 77 is also mounted on the shaft 76. The shaft 76 is positioned in a slot 78, formed in a bracket 79 screwed to the plate 47, for limiting sliding movement as shown in Fig. 4. This shaft is permitted to move slightly and is held in its normal upward position by a spring 81 which engages the gear 77. A mutilated gear 82 is mounted on a shaft 83 carried in the bracket and is adapted to be driven by the gear 77.

A footage indicator 84 is mounted on shaft 83 and is adapted to be operative to indicate the movement of the vehicle, say for a period of the first hundred feet after stopping. An aperture 85 is provided in the dial plate for exposing the footage indicator.

According to the present invention, the footage indicator is reset whenever the automobile is stopped. To accomplish this result a pin 86 is mounted on the mutilated gear 82. A cam surface 87 on one end of an arm 88 pivoted to a bracket 89 is adapted to engage the pin. The other end of the pivoted arm has a resilient leaf spring 90 secured thereto and adapted to be engaged by an arm 91 secured to the gear 36. The leaf spring provides a yielding connection between these elements.

Figure 10:
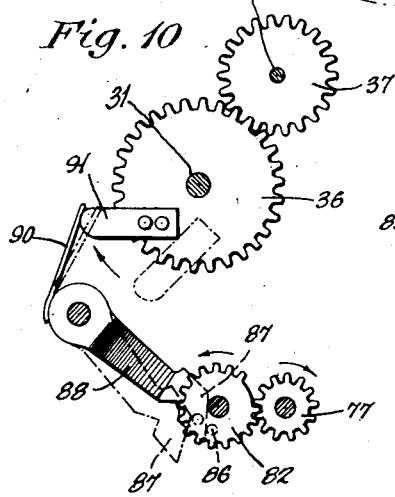
Fig. 10 shows the mechanism for causing the mutilated gear to be moved into engagement with the driving gear.
Figure 11:
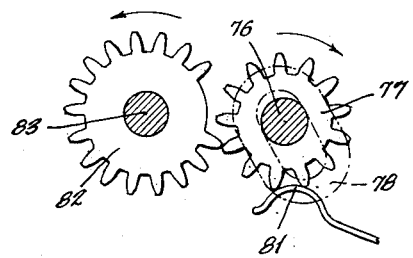
Fig. 11 shows a detailed view of the mutilated gear being moved into engagement with the driving gear, the driving gear being slightly displaced.

As shown in Fig. 10, when the motor vehicle is stopped the gear 36 assumes the position shown in full lines and in which position it contacts the leaf spring 90 and moves the arm 88 so that its cam surface engages the pin and rotates the mutilated gear so that the first tooth adjacent the mutilated portion will engage the gear 77. The resilient mounting of gear 77, as above described, will prevent any damage being done to the gear due to the improper meshing of the teeth and will permit the gear to give so that the teeth may properly fall into mesh engagement. It will be seen, therefore, that this stepping of the gear 82 will move the footage indicator secured to the shaft 83 into initial position for another cycle of operation to indicate travel of the automobile up to say one hundred feet at which time the mutilated portion of the gear will be presented to gear 77 to stop the indicator.

In order to reset the maximum speed arm after the vehicle has been stopped and restarted, a bail member 92, provided with a pin 93 adapted to engage the pawl, is mounted to slide in a guide 94. The lower end of the bail member has a slot 95 through which the shaft 83 extends. At the extremity of the bail member, a pin 96 is mounted and is adapted to cooperate with a cam 97 carried by the shaft 83. It will be seen that as the footage indicator is turned to indicate the number of feet traveled from the last stop, the cam will engage the pin 96 and cause the bail to move downwardly and remove the pawl from the ratchet on the maximum speed needle so that the latter may move back toward initial position to engage the speed-responsive needle.

When the term "stop" has been used throughout the specification it is intended to mean "stop" as defined by traffic laws existing in the community. For example, "stop" may be considered bringing the motor vehicle down to a speed of one or two miles per hour and not require that the vehicle be absolutely still. The reset mechanism can be arranged to start the footage indicator operating at the proper time by altering the position of arm 91 on the gear 36.

It will be seen that the instrument of the present invention is not a decelerometer but provides a means of indicating the maximum speed attained by the vehicle as well as the speed of the vehicle at predetermined intervals relative to the distance travelled after a sudden deceleration is made and the cessation of travel of the vehicle.

Variations and modifications may be made within the scope of this invention and portions of the improvements may be used without others.

I claim:

1. In a speedometer for motor vehicles, the combination of means responsive to the speed of the vehicle for indicating the maximum speed attained by the vehicle; means including a pawl for holding the indicator in maximum position; and means actuated by said speed-responsive means for releasing the pawl and resetting the indicator after the vehicle has resumed travel a predetermined distance after stopping.

2. In a speedometer for motor vehicles, the combination of means responsive to the speed of the vehicle; means for indicating the maximum speed attained by the vehicle; means including a pawl for holding the indicator in maximum position; and means actuated by said speed-responsive means for releasing the pawl and resetting the indicator after the vehicle has resumed travel including a mutilated gear and a resiliently mounted gear normally urged into engagement therewith.

3. In a speedometer for motor vehicles, the combination of means responsive to the speed of the vehicle; means for indicating the maximum speed attained by the vehicle; means including a pawl for holding the indicator in maximum position; means actuated by said speed-responsive means for releasing the pawl and resetting the indicator after the vehicle has resumed travel after stopping comprising a shaft having a mutilated gear thereon; a cam mounted on the shaft to rotate therewith; and a bail member engaging the pawl and having a pin thereon adapted to engage the cam whereby the cam will move the bail member to release the pawl.

4. In a speedometer, speed-responsive means; a dial having indicia thereon; an indicator actuated by the speed-responsive means and movable over the face of the dial to indicate the speed; a plurality of auxiliary indicators mounted behind the dial and extending over the edge of the dial to cooperate with the indicia thereon; means for periodically setting the auxiliary indicators seriatim during the decelerating period to indicate the various speeds at predetermined intervals during this period; and means for resetting the auxiliary indicators after the device has been restarted after being stopped.

5. In a speedometer, speed-responsive means; a dial having indicia thereon; an indicator actuated by the speed-responsive means and movable over the face of the dial to indicate the speed; a plurality of auxiliary indicators mounted behind the dial and extending over the edge of the dial to cooperate with the indicia thereon; means for mounting the auxiliary indicators comprising a sleeve having a plurality of collars freely rotatable thereon and each carrying one of the auxiliary indicators; means for periodically setting the auxiliary indicators seriatim during the decelerating period to indicate the various speeds at predetermined intervals during this period; and means for resetting the auxiliary indicators after the device has been restarted after being stopped.

6. In a speedometer, speed-responsive means; a dial having indicia thereon; an indicator actuated by the speed-responsive means and movable over the face of the dial to indicate the speed; a plurality of auxiliary indicators mounted behind the dial and extending over the edge of the dial to cooperate with the indicia thereon; means for mounting the auxiliary indicators comprising a sleeve concentric with and surrounding the actuator for the speed-responsive indicator and having a plurality of collars freely rotatable thereon and each carrying one of the auxiliary indicators; means for periodically setting the auxiliary indicators seriatim during the decelerating period to indicate the various speeds at predetermined intervals during this period; and means for resetting the auxiliary indicators after the device has been restarted after being stopped.

7. In a speedometer, speed-responsive means; a dial having indicia thereon; an indicator actuated by the speed-responsive means and movable over the face of the dial to indicate the speed; a plurality of auxiliary indicators mounted behind the dial and extending over the edge of the dial to cooperate with the indicia thereon; means for mounting the auxiliary indicators comprising a sleeve having a plurality of collars freely rotatable thereon and each carrying one of the auxiliary indicators; resilient means for normally urging the freely rotatable collars and auxiliary indicating means to an initial position and pawls for resisting such movement; means for periodically releasing the pawls to set the auxiliary indicators seriatim during the decelerating period to indicate various speeds at predetermined intervals during this period; and means for resetting the auxiliary indicators after the device has been restarted after it has been stopped.

8. In a speedometer, speed-responsive means; a dial having indicia thereon; an indicator actuated by the speed-responsive means and movable over the face of the dial to indicate the speed, the indicator having a pin at its outer end; a plurality of auxiliary indicators mounted behind the dial and extending over the edge of the dial to cooperate with the indicia thereon, and also to engage the pin on the speed-responsive means to be actuated thereby; means for mounting the auxiliary indicators comprising a sleeve having a plurality of collars freely rotatable thereon and each carrying one of the auxiliary indicators; resilient means for normally urging the freely rotatable collars and auxiliary indicating means into a position to engage the pin on the speed-responsive indicator and pawls for resisting such movement; means for periodically releasing the pawls to set the auxiliary indicator seriatim during the decelerating period to indicate various speeds at predetermined intervals during this period; and means for resetting the auxiliary indicator after the device has been restarted after it has been stopped.

EDWARD V. DARDANI.